Figure 1:
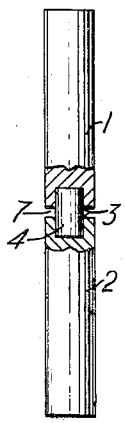

H. A. NEWCOMB.
ELECTRIC WELDING PROCESS.
APPLICATION FILED MAY 11, 1914.

1,270,860.

Patented July 2, 1918.

WITNESSES:
Fred A. Lind.
R. D. Brown

INVENTOR
Harold A. Newcomb
BY
Wesley G. Carr
ATTORNEY

UNITED STATES PATENT OFFICE.

HAROLD A. NEWCOMB, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRIC WELDING PROCESS.

1,270,860.   Specification of Letters Patent.   Patented July 2, 1918.

Application filed May 11, 1914. Serial No. 837,727.

*To all whom it may concern:*

Be it known that I, HAROLD A. NEWCOMB, a citizen of the United States, and a resident of Wilkinsburg, in the county of Allegheny and State of Pennsylvania, have invented a new and useful Improvement in Electric Welding Processes, of which the following is a specification, My invention relates to electric welding processes, and it has special reference to processes in which the metals to be united are placed in contact with each other, heated by the passage of an electric current until they reach the proper point of plasticity, and caused to diffuse into each other at their point of contact by the application of pressure.

The object of my invention is to provide a simple and effective process of welding together metals having properties which have prevented successful welding by the methods heretofore employed.

Great difficulty has heretofore been experienced in welding together two metals of widely differing melting points because the metal having the lower melting point passes its critical point of plasticity, and may even melt, before the other metal has been affected by the applied heat. It has been found particularly difficult to weld steel to tungsten and molybdenum because of the great differences between the melting points of steel and of these metals, and also because of the great density of the tungsten and molybdenum, especially the ductile forms of these metals, which prevents intermolecular diffusion unless they are heated to temperatures far above the melting point of steel. Tungsten, moreover, oxidizes rapidly when heated in the presence of air, and the coating of oxid so forming interferes seriously with the formation of proper welds.

I have overcome the above-indicated difficulties and succeeded in producing perfect welds between steel and tungsten and also between other metals which it has not heretofore been possible to weld together, by selecting such dimensions for the pieces to be welded that the metal of high melting point is heated to a much higher temperature by a given current than the metal of low melting point, so that both metals reach their critical points of plasticity at substantially the same time. I avoid harmful oxidation of such metals as tungsten by protecting the metal from exposure to the air during the heating process. This result may be attained by surrounding the joint to be welded with a shield of refractory material, or better, by forming a cup or recess in the steel at the point where the weld is to be made, the recess being of the proper size and shape to receive the piece of tungsten or other readily oxidizable metal. I find it convenient, when welding steel and tungsten rods together, to use two pieces of steel and a single short piece of tungsten, each of the steel pieces having a recess adapted to receive one end of the tungsten piece.

Figure 2:
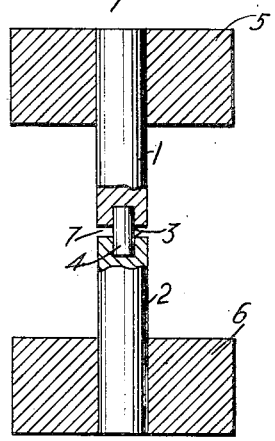
Figure 3:
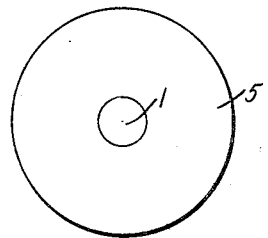

In the accompanying drawings, Figure 1 is an elevational view, partially in section, showing one manner in which the bodies to be welded together may be formed and assembled according to my process. Fig. 2 is an elevational view similar to Fig. 1, showing differently proportioned pieces of metal, and showing diagrammatically the manner in which the assembled pieces are held in a pressure-applying device during the welding process. Fig. 3 is a plan view of the structure shown in Fig. 2 and Fig. 4 is an elevational view similar to Fig. 1 showing pieces of metal having slightly different dimensions.

Figure 4:
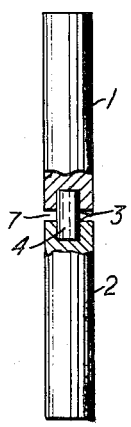

Each of Figs. 1, 2 and 4 shows a pair of steel rods 1 and 2, each of which has a cup or recess 3 formed in one end, the recesses being of proper size to receive a short length 4 of tungsten or other metal of high melting point and high resistance to heat, and having such dimensions that its electrical resistance is also high as compared with the resistance of the steel pieces. The pieces 4 and the recesses 3 are so proportioned, regard being had to the characteristics of the metals, that, when the pieces are assembled together, as shown in the drawing, a short gap 7 will be left between the adjacently disposed ends of the rods 1 and 2. The gap 7 may be of such width as to be closed when surface diffusion between the adjacent pieces has proceeded to a predetermined degree.

The pieces are assembled in the relation described, and are placed in a pressure-applying device, which may be of any suitable and well known form. In Fig. 2 of the drawing, such a device is indicated diagrammatically by the supports 5 and 6, which may conveniently be the jaws of a spot-welding machine. The rods 1 and 2 are connected to a source of electric current (not shown) of relatively high amperage and relatively low voltage, such as is ordinarily employed in welding operations. Pressure is applied by means of the jaws 5 and 6 as soon as the current is passed through the pieces of metal. The piece 4, being of smaller cross-section than the pieces 1 and 2, and, therefore, having a higher electrical resistance, becomes much hotter than the adjacent metal, and, if the dimensions of the parts have been properly selected, both of the metals are heated to the proper condition of plasticity at the same instant, when they diffuse into each other under the influence of the applied pressure. The gap 7 is thus closed, the welding action automatically ceases, the whole rod becomes a unitary conductor, the resistance of which is much less than the resistance of the piece 4 alone, and the whole rod becomes heated uniformly. I may then interrupt the current and increase the pressure between the jaws 5 and 6, in order to insure thorough diffusion at the points of union between the metals.

In connection with the process described above, I may make use of fluxes such as potassium nitrate, potassium nitrite, borax, or a mixture of these, but I have obtained excellent results without the use of any fluxes.

The precise dimensions to be given the pieces to be welded, in order that the metals may reach their critical points of plasticity at the same moment, must be determined in each case according to the properties and the necessary shapes of the pieces under treatment. When tungsten and steel are the metals to be welded, particular regard must be had to the density of the tungsten, which varies greatly according to the method by which the tungsten has been reduced. Tungsten of high density, such as ductile tungsten, must be heated to a higher temperature in order to produce the proper plastic condition than, for example, sintered tungsten, and, consequently, when ductile tungsten is employed, pieces of greater length or smaller cross section, or both, must be selected. I have found that, by forming tungsten rods of proper dimensions and heating them in contact with steel by passing an electric current through both, the tungsten may be made softer than the steel, notwithstanding the fact that the melting point of the tungsten is more than 2000° C. higher than that of the steel. Regard must also be had to the relative conductivities of the metals under treatment, and it may be stated, in a general way, that the conductivities of two metals, when treated according to my process, vary directly as their melting points. Another factor to be taken into consideration, is the radiation of heat from the highly heated tungsten to the cooler steel, which makes it possible to use a piece of steel of lower resistance than would otherwise be necessary, in order that the steel may be raised to the proper temperature.

Various relative dimensions of tungsten and steel rods which have been welded successfully according to my process are shown in Figs. 1, 2 and 4 of the drawing. The tungsten piece 4 shown in Fig. 1 is of sintered tungsten of relatively low density, and is therefore of larger diameter than the corresponding piece shown in Fig. 2, which is of very dense ductile tungsten. The piece 4 shown in Fig. 4 is of a variety of tungsten intermediate in density between the pieces shown in Figs. 1 and 2 and it is accordingly of intermediate diameter.

Various applications of welded metals produced according to my process will readily suggest themselves to persons skilled in the art. For example, when it is desired to form electrical contact elements having an effective surface of tungsten attached to an iron or steel support, rods of steel and tungsten may be welded together according to the process described above and then broken at the joint, half of the tungsten rod being attached to each of the steel rods. The welded end of each half may then be ground into any suitable form.

An electrical contact element made by the process hereinbefore described constitutes the subject-matter of an application, Serial No. 70,264, filed January 4, 1916.

While I have described my process in connection with the welding of steel to a refractory metal of the tungsten type, specifically tungsten or molybdenum, it is to be understood that my process may be applied with equal success to any other pairs of metals, especially where one of the metals is of much higher melting point and density than the other metal. It is also to be understood that modifications of the process herein described may be made by persons skilled in the art without departing from the spirit of my invention, and that only such limitations are to be imposed as are indicated in the appended claims.

I claim as my invention:

1. The process of welding metals that consists in pressing together the surfaces of two bodies of metals having different melting points, and simultaneously heating the said bodies unequally in substantial proportion to their melting points until surface diffusion is effected.

2. The process of welding metals that consists in effecting engagement between the surfaces of two bodies of metals having different melting points, and heating the engaging portions of the two metals to such condition of plasticity as to cause surface diffusion, the said bodies being so shaped and proportioned as to automatically interrupt such diffusion at a predetermined stage.

3. The process of welding metals that consists in effecting engagement between the surfaces of two bodies of metals having different melting points, subjecting said bodies to an electric current to bring the engaging portions of the two metals, at substantially the same time, to such condition of plasticity as to cause surface diffusion between the said metals, automatically interrupting the said current, and applying increased pressure to the said bodies.

4. The process of welding metals that consists in effecting engagement between the surfaces of two bodies of metal having different melting points, and applying heat to the said bodies in such a manner as to raise the metal having the higher melting point to a higher temperature than the metal having the lower melting point, the said bodies being so shaped and proportioned as to cause automatic discontinuance of the unequal heating at a predetermined stage.

5. The process of welding metals that consists in passing an electric current through two engaging bodies of metals having different melting points and such relative proportions that the engaging portions of both bodies are heated, at substantially the same time, to such condition of plasticity as to cause surface diffusion between them, applying longitudinal pressure to the said bodies, interrupting the electric current, and applying additional longitudinal pressure to the said bodies.

6. The process of welding metals that consists in effecting engagement between the surfaces of a body of refractory metal of the tungsten type and a body of a metal of lower melting point, preventing access of air to the said refractory metal and applying heat unequally to both of the said metals in substantial proportion to their melting points.

7. The process of welding metals that consists in forming recesses in two metal bodies having relatively low melting points, disposing in the said recesses the two ends of a rod composed of a readily oxidizable metal having a relatively high melting point, the said recesses being of such depth that the said rod is substantially inclosed within them, and applying heat and pressure to the said metal bodies.

8. The process of welding metals that consists in forming recesses in two metal bodies having relatively low melting points, disposing in the said recesses the two ends of a rod composed of a readily oxidizable metal having a relatively high melting point, and applying an electric current and longitudinal pressure to the assembled metal bodies, the said bodies and rod being so proportioned as to be simultaneously heated by the electric current to such degree of plasticity as to cause surface diffusion between them.

9. The process of welding metals that consists in disposing a body of readily oxidizable metal having a relatively high melting point in a recess formed in a body of metal having a lower melting point and applying electric current and pressure to said metal bodies.

10. The process of welding metals that consists in forming recesses in two metal bodies having relatively low melting points, disposing in the said recesses the two ends of a rod composed of a readily oxidizable metal having a relatively high melting point, the said recesses being of such depth that, when the ends of the said rod are disposed therein, the bodies containing the said recesses are spaced apart, heating the assembled bodies and rod and applying pressure to force the bodies toward each other.

11. The process of welding metals that consists in forming recesses in the ends of two iron or steel bodies, seating a body of a refractory metal of the tungsten type in the said recesses and applying heat and pressure to the said metal bodies to weld the ends of the refractory-metal body to the bottoms of the recesses in the iron or steel bodies.

In testimony whereof, I have hereunto subscribed my name this 30th day of April, 1914.

HAROLD A. NEWCOMB.

Witnesses:
 WM. T. EGAN, Jr.,
 B. B. HINES.